United States Patent [19]

Greene

[11] Patent Number: 4,691,879
[45] Date of Patent: Sep. 8, 1987

[54] JET AIRPLANE

[76] Inventor: Vibert F. Greene, 19400 Sorenson Ave., Cupertino, Calif. 95014

[21] Appl. No.: 875,024

[22] Filed: Jun. 16, 1986

[51] Int. Cl.$^4$ .............................................. B64C 39/08
[52] U.S. Cl. .................................. 244/45 R; 244/13; 244/45 A; 244/15
[58] Field of Search .................. 244/45 R, 45 A, 4 R, 244/15, 13

[56] References Cited

U.S. PATENT DOCUMENTS

| D. 138,538 | 8/1944 | Clerc | D12/331 |
| D. 155,569 | 10/1949 | Bailey | D12/331 |
| 3,447,761 | 6/1969 | Whitener et al. | 244/15 |
| 4,378,922 | 4/1983 | Pierce | 244/45 A |
| 4,452,266 | 6/1984 | Ogino et al. | 244/53 B |

Primary Examiner—Joseph F. Peters, Jr.
Assistant Examiner—Rodney Corl
Attorney, Agent, or Firm—Townsend and Townsend

[57] ABSTRACT

An airplane having a number of airfoils including a delta nose wing, a winglet, a midspan wing, a V-tail delta wing without an upswept fuselage, a vertical tail and upper body stabilizer. These airfoils are coupled with a system of four jet engines and an aft center of gravity. Full control of the airplane is possible under high maneuverability conditions, extremely high accelerations and at large angles of attack. The delta nose wing creates swirling vortices that contribute substantially to the lift of the nose section. The winglet, an extension of the delta nose wing, allows the turbulent wake from the leading edge of the delta nose wing to flow over its upper surface to create additional lift while the midspan wing causes the turbulent flow over its upper surface to form a turbulent wake at its leading edge. The V-tail delta wing with a V-shaped underside and blunt leading edge gives additional lift and control to the airplane. A flow regulator helps to direct and control the flow field to the underside of the delta nose wing and nose strake. There are eight pairs of control surfaces including an upper body stabilizer system for the control and stability of the airplane. The design and locations of the airfoils and jet engines provide rising hot air (exhaust) over the top, inner portion of the midspan and tail wings, a low pressure region over the top of the airfoils, and a higher pressure region on the airplane underside to create the necessary lifting forces. The center of gravity is located aft of the airplane between the exit nozzle of the forward engines and forward of the transverse centerline of the aft landing gears.

13 Claims, 8 Drawing Figures

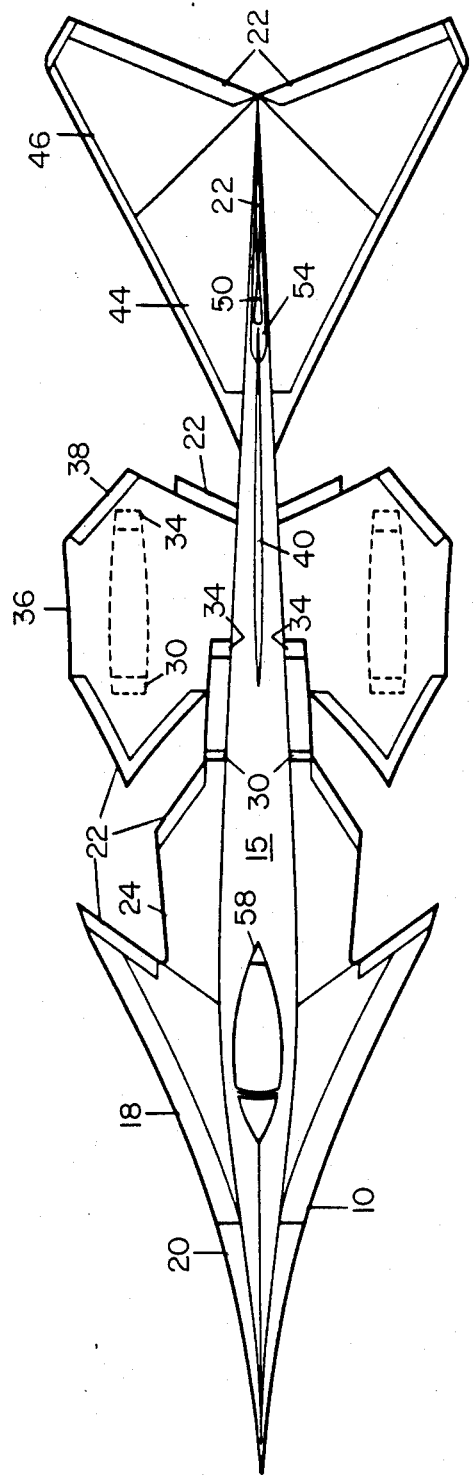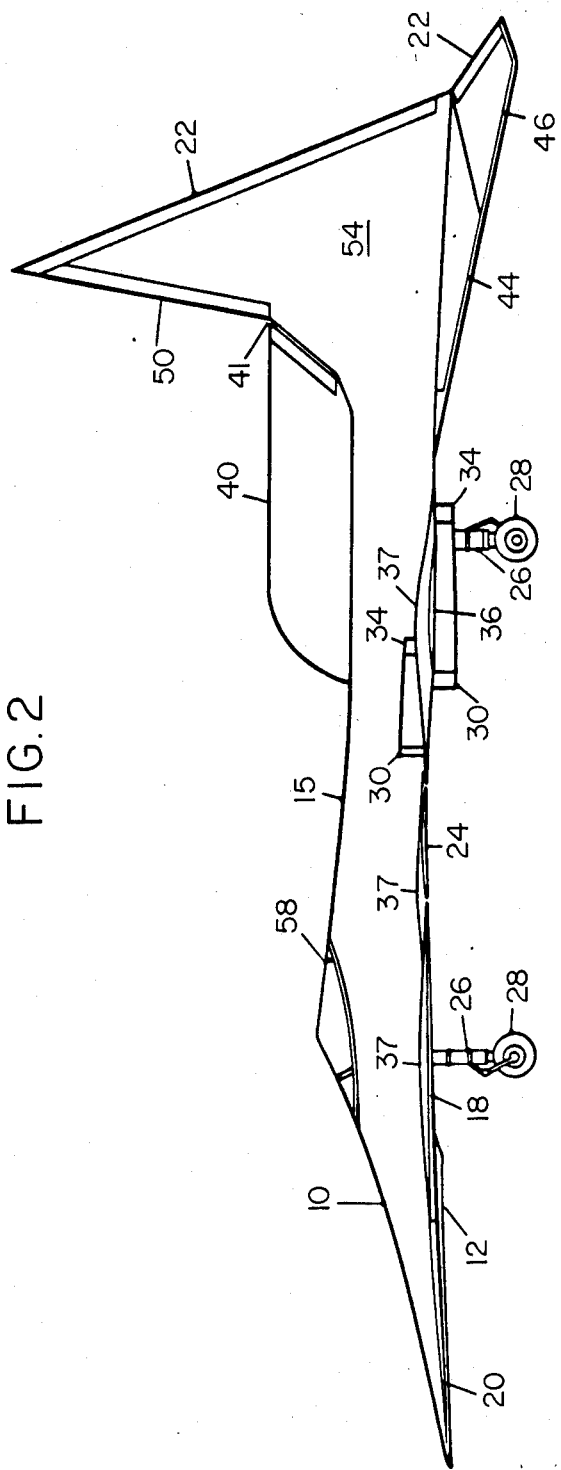

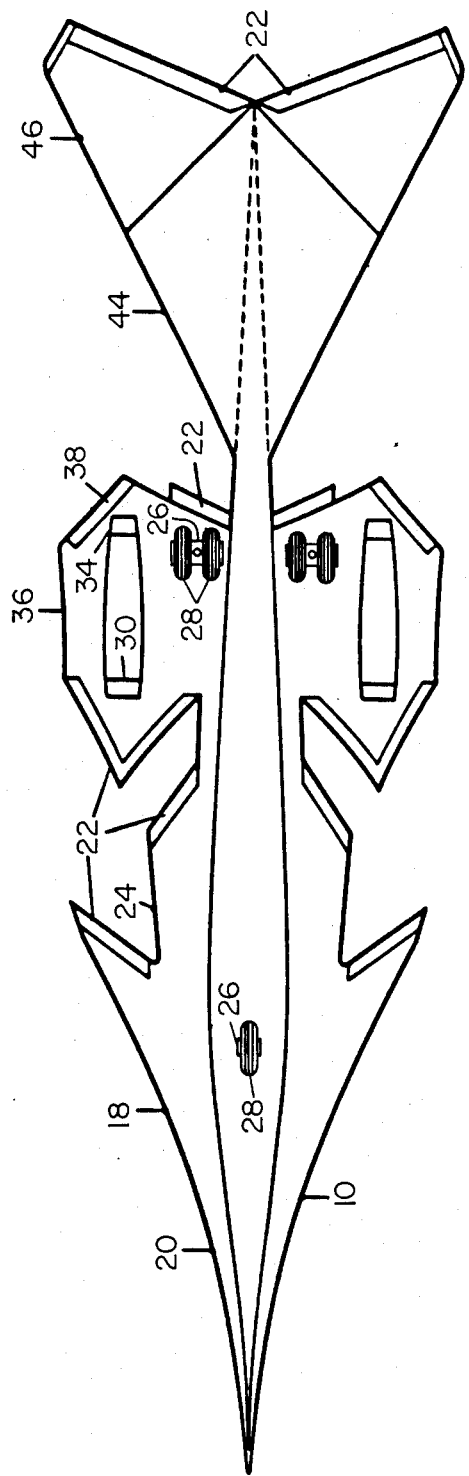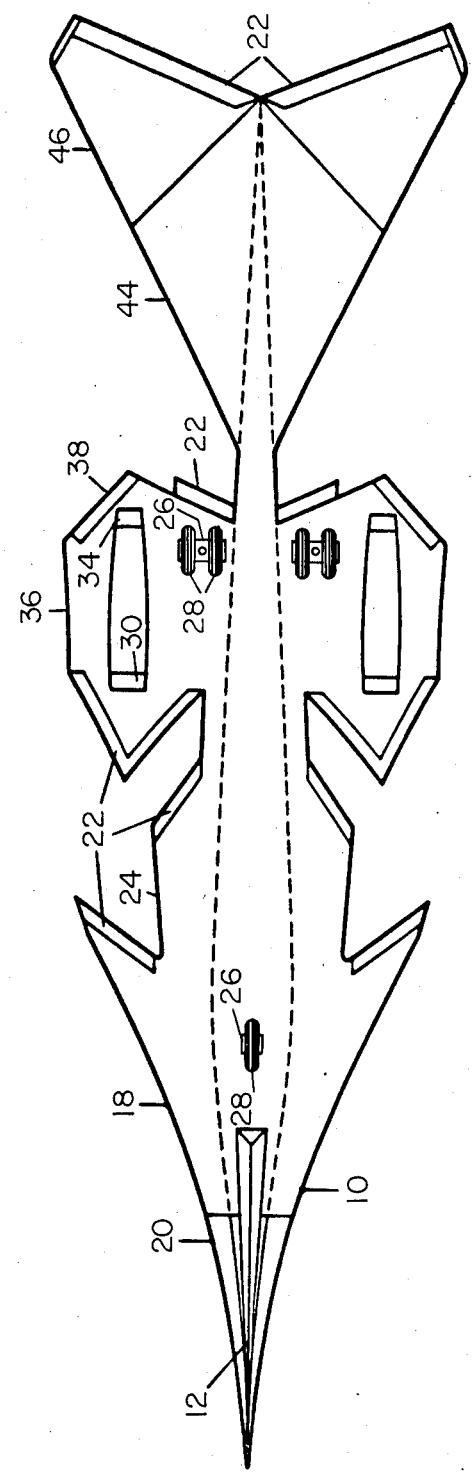

JET AIRPLANE

The present invention is directed to an airplane for trans-atmospheric use and which is capable of tracking, intercepting and shooting down an intercontinental ballistic missile.

BACKGROUND OF THE INVENTION

Conventional high speed, subsonic airplanes are designed with large stabilizer surfaces and a forward center of gravity in the range of 25%-35% mean aerodynamic cord (MAC) for normal stability. Both the large stabilizer surface and the forward center of gravity of such airplane decrease aircraft performance and increase fuel usage. Some commercially operational airplanes have a 12% MAC forward center of gravity limit and a 35% MAC aft center of gravity limit as compared with the conventional baseline airplane with a center of gravity location at 25% MAC.

The economics of increased performance with lower fuel use becomes a compelling incentive for improved aerodynamic performance of all airplanes. An optimum, new aircraft design must be capable of high aerodynamic performance with low fuel usage at any angle of attack. It must have reduced aerodynamic trim drag and high maneuverability. It must have lower tail drag and lower structural weight. Reduced aerodynamic trim drag can be achieved by a further aft center of gravity balancing. The tail drag can be reduced by the use of a smaller, horizontal tail surface or a new tail wing design. The further aft center of gravity feature coupled with a new tail section design can also aid in the reduction of tail drag.

Increased aircraft performance can also be achieved by the use of supercritical wings which increase significantly the lift to drag ratio (L/D) at conventional static margins. However, the trim drag is very large. Supercritical wings at normal or conventional static margins (25% MAC) produce twice as much trim drag as conventional wings at conventional static margins. Thus, for supercritical wings at normal static margins, to eliminate the trim drag, the airplane would have to fly 10%-15% statically unstable. To do so would require the use of a stability and control augmentation system or pitch active control system (PACS). Such a system permits an aircraft to operate at reduced static margins approaching the neutral point.

Research has shown that with PACS non-operational, the flying qualities degrade quickly as the center of gravity moves aft and approaches the static neutral point (40% MAC) and becomes unacceptable for negative static margins of 5% or less, i.e., 40%-45% MAC. With the center of gravity at 35%-45% MAC, the airplane is still flyable. At 45%-50% MAC, the airplane becomes essentially unflyable.

For optimum performance, both the supercritical wings and a further aft center of gravity with balance is used. This combination produces an even higher L/D ratio without the large trim drag; however, the airplane would have to operate at 10%-15% static instability with the use of an effective stability and automatic control system.

Some of the desired features of aft center of gravity airplanes with controlled balance, i.e., PACS activated, are as follows:

(1) They can fly higher because the center of pressure is ahead of the center of gravity;

(2) With control balance, they can improve airport efficiency and performance and (a) allow slower takeoff speeds, (b) allow slower landing speeds, and (c) make use of shorter landing strips;

(3) As the center of gravity moves aft to 50% MAC, they have satisfactory handling qualities; however, degradation will occur with the center of gravity at 50%-60% MAC. The handling qualities with the center of gravity at 50% MAC (10% statically unstable) are as good as the basic unaugmented aircraft with the center of gravity at 25% MAC (15% statically stable);

(4) They have stall attitudes which become higher as the center of gravity moves aft.

SUMMARY OF THE INVENTION

The present invention is directed to an airplane of improved characteristics which give the desired optimum performance without the operational, static instability experienced by airplanes whose centers of gravity are aft and which have operational PACS. The present invention, therefore, allows a pilot of the airplane to maintain full control of the airplane during high manueverability at extremely high accelerations and at large angles of attack.

The present invention is a revolutionary, trans-atmospheric airplane capable of tracking, intercepting and shooting down an intercontinental ballistic missile. The airplane of the present invention has a number of airfoils including a delta nose wing, a winglet, a midspan wing, a V-tail delta wing without an upswept fuselage, a vertical tail and upper body stabilizer. These airfoils, coupled with a system of four jet engines suitably located and an aft center of gravity, give the pilot of the airplane full control of the airplane under high maneuverability, extremely high accelerations and at large angles of attack.

The delta nose wing located at the nose of the airplane creates swirling vortices that contribute substantially to the lift of the nose section and provide the high aerodynamic performance attributed to its shape. The winglet, an extension of the delta nose wing, allows the turbulent wake from the leading edge of the delta nose wing to flow over its upper surface to create additional lift while the midspan wing causes the turbulent flow over its upper surface to form a turbulent wake at its leading edge. This action creates the required lifting force for the midspan wings. Aft of the aircraft, the V-tail delta wing with its V-shaped underside and blunt leading edge gives additional lift and control to the airplane. There is no upswept fuselage; thus, there is no vortex pair behind the afterbody of the airplane to give rise to the tremendous drag attributed to the upswept fuselage vortex pair.

Forward of the airplane and below the delta nose wing is a flow regulator that helps to direct and control the flow field to the underside of the delta nose wing and nose strake. Including symmetry, there are eight pairs of control surfaces including an upper body stabilizer system for the control and stability of the airplane. The control surfaces are comprised of the following:

(a) One pair of flaps on the outermost portion of the delta nose wing;
(b) One pair of flaps on the winglet;
(c) Two pairs of flaps adjacent to each other at the forward ends of the midspan wing, such flaps deflecting downwardly;
(d) A single pair of flaperons to provide the effects of flaps and ailerons aft of the midspan wing;

(e) One pair of extensible flaps on the inside of the midspan wing between the two aft jet engines for downward deflection only, they are also located aft of the midspan wing;

(f) One pair of flaps on the V-tail delta wing adjustable section;

(g) A upper body stabilizer system including one flap; and (h) A vertical tail including one flap.

The movements of the control surfaces mentioned above are controlled by actuators. There are also four high performance jet engines on the airplane. The forward pair of jet engines bridges the winglet and the midspan wing, such engines being located aft of the winglet and forward of the midspan wing. The aft pair of jet engines on the underside of the airplane are positioned aft of the forward engines and on the same longitudinal center line as each half of the midspan wing.

The design and location of the airfoils and the jet engines provide rising hot air (exhaust) over the top, inner portion of the midspan and tail wings, a low pressure region over the top of the airfoils, and a higher pressure region on the airplane underside to create the necessary lifting forces. The center of gravity, located aft of the airplane between the exit nozzle of the forward engines and forward of the transverse centerline of the aft landing gears, gives the desired pilot control and stability of the airplane during high maneuverability at extremely high accelerations and at large angles of attack without the need for a pitch-active control system which is common to conventional baseline airplanes with aft centers of gravity.

There are three landing gears, one forward and two aft. The forward landing gear is longer than the aft landing gears, thus placing the aircraft at an inclined angle when the airplane is on the ground. The inclined position of the airplane aids in the takeoff and landing performance of the airplane.

The airplane of the present invention exhibits a new "fly by the tail" concept as provided by the theoretical lift force profile. The principal contributor to this concept is the tail section design and the aft CG location.

The primary object of the present invention is to provide an improved airplane capable of tracking, intercepting and shooting down an intercontinental ballistic missile wherein the airplane has means permitting the pilot thereof to maintain full control of the airplane during high maneuverability at extremely high accelerations and at large angles of attack and with an aft center of gravity.

Other objects of this invention will become apparent as the following specification progresses, reference being had to the accompanying drawings for an illustration of the invention.

IN THE DRAWINGS:

FIG. 1 is a side elevational view of the improved airplane of the present invention showing the landing gears thereof in a down position;

FIG. 2 is a top plan view of the airplane of FIG. 1;

FIG. 7a is a bottom plan view of the airplane, showing the airfoils, the delta nose wing, winglet, midspan wing and V-tail delta wing as a continuum; and FIG. 7b is a view similar to FIG. 7a except that the delta nose wing, winglet and midspan area form a continuum rib on both sides of the airplane fuselage.

Figure 5:
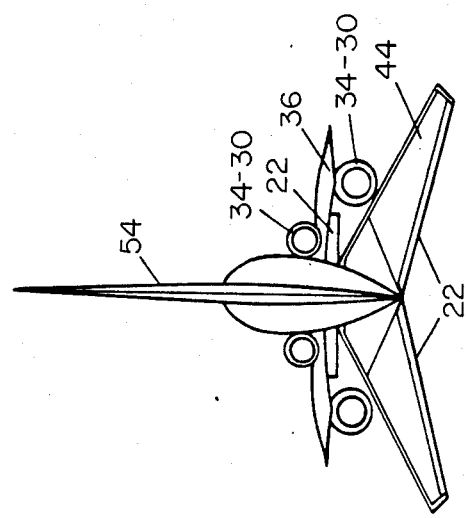
FIG. 5 is a rear elevational view of the airplane.

The airplane of the present invention is broadly denoted by the numeral 10. It can be used for high altitude and high speed flight with high maneuverability and great accelerations at large angles of attack with full pilot control. Thus, the airplane is especially suitable for military and civilian uses.

The airplane 10 is made up of a number of interconnected parts which act to permit the airplane to have high stability during supersonic and subsonic speeds, low drag forces, high maneuverability and high accelerations at large angles of attack with full pilot control, slower takeoff and slower landing speeds, high altitude flights, high reliability and high overall performance at all times.

Airplane 10 is comprised of a streamlined body or fuselage 15 having a cockpit 58 and a nose strake 20 which is near the forward section of the delta nose wing 18. Delta nose wing 18 has a swept leading edge and is operable to cause swirling vortices to be developed about the leading edge, thus creating a substantial lifting force on the nose section and providing higher aerodynamic performance for the airplane. Flaps 22 are pivotally mounted at the rear margins of nose wing 18 and at the rear margins of the winglet 24 which is directly behind the delta nose wing 18. Winglet 24 is operable to allow an extension of the turbulent wake developed at the leading edge of the delta nose wing to flow over its upper surface and create additional lift on the forward section of the airplaine. Rearwardly of flaps 22 is almond shaped midspan wing 36 which includes also flaps 22 and flaperons 38 which are pivotally mounted on the outer rear margins of the midspan wing 36. Midspan wing 36 has a construction to cause turbulent airflow over its upper surface to develop into a turbulent wake at its leading edge for the necessary lift force. A forward set of jet engines 30 are adjacent to the sides of the airplane fuselage 15 near the front flaps 22 of midspan wing 36 and substantially bridge the distance between the winglet 24 and the midspan wing 36. The forward jet engines 30 have exit nozzles 34. An aft set of jet engines are carried on the underside of midspan wing 36 on opposite sides of the fuselage rearwardly of the forward jet engines 30. Aft jet engines 30 have exit nozzles 34 also.

The tail section of airplane 10 consists of an upper body stabilizer 40, the vertical tail 54 with inclined flaps 22 at the rear margin thereof and secondary airfoil 50 at the front margin of the vertical tail 54. The tail section also has a V-tail delta wing 44 with adjustable aft section 46 and flaps 22. V-tail delta wing 44 is operable to generate two large swirling vortices about its leading edge to create lift forces for the fuselage. Forward of the airplane and below the delta nose wing 18 is a flow regulator 12, which directs and controls the flow field of the air along the underside of the delta nose wing and nose strake.

FIG. 1 shows the airplane 10 with nose strake 20, front landing gear 26 with front wheel 28 thereon. FIG. 1 also shows the contour of the airfoils' curved surfaces 37 of the delta nose wing 18, winglet 24 and midspan wing 36. Upper body stabilizer 40 is separated from the vertical tail 54 by an airgap 41 (FIG. 1). Also shown in FIG. 1 is cockpit 58, fuselage 15 and jet engines 30 with their exit nozzles 34, along with the secondary air foil 50 of the vertical tail 54 with inclined flaps 22 and the adjustable aft sections 46 with flaps 22 of the V-tail delta wing 44.

FIG. 2 shows airplane 10 with nose strake 20, delta nose wing 18 with flaps 22, winglet 24 with flaps 22, midspan wing 36 with flaps 22 and flaperons 38, cockpit 58, fuselage 15, and jet engines 30 with nozzles 34. The upper body stabilizer 40 and vertical tail 54 with its secondary airfoil and flap 22 is also shown in FIG. 2 along with V-tail delta wing 44, its adjustable aft section 46 and flaps 22.

Figure 3:
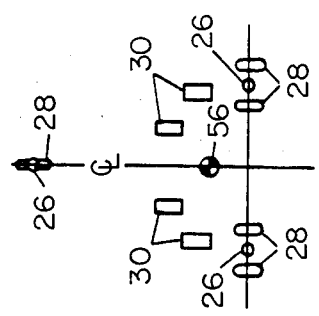
FIG. 3 is a block diagram showing the aft center of gravity location of the airplane relative to the forward and aft jet engines and the forward and aft landing gears and wheels.

FIG. 3 shows a block diagram of certain components of the airplane 10. FIG. 3 shows the aft center of gravity 56 of the airplane, the front and rear wheels 28 thereof and the forward and rear jet engines 30 on opposite sides of fuselage 15.

Figure 4:
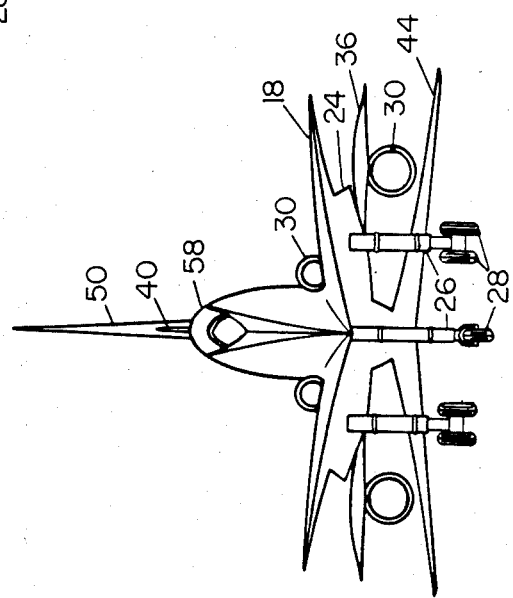
FIG. 4 is a front elevational view of the airplane.

FIG. 4 shows the airplane 10 with secondary airfoil 50 and upper body stabilizer 40. Cockpit 58 is shown along with the forward and rear jet engines 30, the delta nose wing 18, winglet 24, midspan wing 36, V-tail delta wing 44 and landing gears 26 and wheels 28. All of such components are symmetrical with respect to the fore and aft centerline of the airplane.

FIG. 5 shows airplane 10 with vertical tail 54, jet engines 30 with exhaust nozzles 34, midspan wing 36 with flaps 22 and V-tail delta wing 44 with flaps 22.

Figure 6:
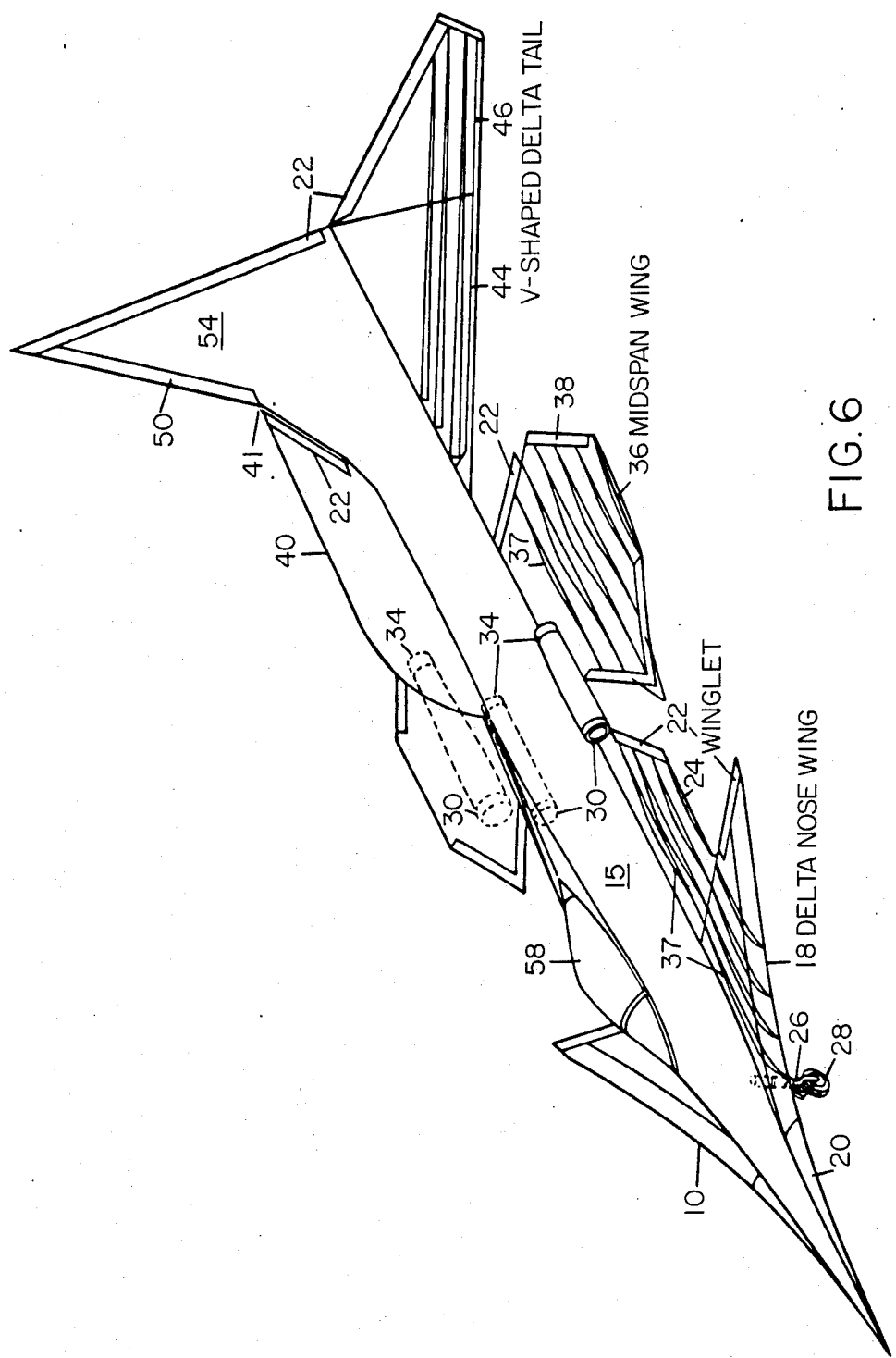
FIG. 6 is a perspective view of the airplane looking aft.

FIG. 6 shows a perspective view of airplane 10 with the skin of the left delta nose wing 18, winglet 24, midspan wing 36 and V-delta tail 44 removed to show the construction of such components. Also shown in FIG. 6 is the contour of curved surfaces 37 of the delta nose wing 18, winglet 24, and midspan wing 36. Also shown in FIG. 6 are the nose strake 20, cockpit 58, fuselage 15, jet engines 30 with exhaust nozzles 34, upper body stabilizer 40 with flaps 22, vertical tail 54 with inclined flaps 22 and secondary airfoil 50. An airgap 41 is shown as separating flap 22 of upper body stabilizer 40 from vertical tail 54.

FIG. 7a shows a bottom plan view of airplane 10 with nose strake 20, delta nose wing 18 with flaps 22, winglet 24 with flaps 22, midspan wing 36 with flaps 22 and flaperons 38, and V-tail delta wing 44 with adjustable section 46 and flaps 22 as a continuum. Also, flow regulator 12, forward and rear jet engines 30 with exhaust nozzles 34, and landing gears 26 with wheels 28 are shown in FIG. 7a.

FIG. 7b shows a view similar to FIG. 7a except that nose strake 20, delta nose wing 18 with flaps 22, winglet 24 with flaps 22 and midspan wing 36 with flaps 22 and flaperons 38 are a continuum rib on both sides of airplane 10. FIG. 7b also shows the aft jet engines 30 with exhaust nozzles 34, the V-tail delta wing 44 with its adjustable aft sections 46 including flaps 22, landing gears 26 and wheels 28.

I claim:

1. A high performance jet airplane comprising:
   a fuselage having a delta nose wing and nose strake;
   a winglet on the fuselage rearwardly of the nose wing;
   a midspan wing coupled with the fuselage rearwardly of the winglet, each of said nose wing, said winglet and said midspan wing having flap means thereon near the rear marginal edge thereof;
   a pair of high performance jet engines on each side, respectively, of the fuselage, one of the engines of each side being forwardly of the other engine of the corresponding side;
   an upper body stabilizer on the fuselage rearwardly of the midspan wing;
   a vertical tail on the fuselage rearwardly of the upper body stabilizer, the vertical tail having flap means at the rear marginal edge thereof;
   a V-tail delta wing having two adjustable wing sections and a flap at the rear marginal edge of each adjustable section, respectively; and
   an air flow regulator for directing and controlling the flow field of the air along the underside of the delta nose wing and nose strake, said airplane having an aft center of gravity to provide the pilot full control, the airplane being highly maneuverable at high accelerations and at large angles of attack.

2. An airplane as set forth in claim 1, wherein said midspan wing has flap means at the forward marginal edge thereof and flaperon means at the outer rear marginal edge thereof.

3. An airplane as set forth in claim 1, wherein the forward jet engines substantially bridge the distance between the winglet and the midspan wing.

4. An airplane as set forth in claim 1, wherein the aft jet engines substantially are located on the underside of the midspan wing.

5. An airplane as set forth in claim 1, wherein an air gap is between the rear marginal edge of the upper body stabilizer and the front marginal edge of the vertical tail.

6. An airplane as set forth in claim 1, wherein the airplane has a front nose wheel and a pair of rear wheels on respective sides of the fuselage.

7. An airplane as set forth in claim 1, wherein the delta nose wing has a swept leading edge and a trailing edge provided with flap means thereon, said delta nose wing being operable to cause swirling vortices to be developed about the leading edge thereof, thus creating a substantial lifting force on the nose section and providing higher aerodynamic performance for the airplane.

8. An airplane as set forth in claim 1, wherein the air flow regulator is on the underside of the delta nose wing for control and direction of air flow towards the under surfaces of the airfoils.

9. An airplane as set forth in claim 1, wherein each half of the midspan wing is almond-shaped with a pair of flaps at its forward end and an extensible flap at its aft end, there being a flaperon defining an outermost control surface and an extensible flap defining an innermost control surface of the midspan wing, said midspan wing having a construction to cause turbulent air flow over its upper surface to develop into a turbulent wake at the leading edge for the necessary lift force.

10. An airplane as set forth in claim 1, wherein the winglet substantially spans the distance between the delta nose wing and the midspan wing, each half of the winglet including an angled flap at its aft end, said winglet being operable to allow an extension of the turbulent wake developed at the leading edge of the delta nose wing to flow over its upper surface, to thereby create additional lift to the forward section of the airplane.

11. An airplane as set forth in claim 1, wherein the vertical tail includes a fixed, secondary airfoil at its forward end and a forwardly inclined flap at its rear end to provide control therefor.

12. An airplane as set forth in claim 1, wherein said V-tail delta wing includes an upside-down, V-shaped underside with a blunt leading edge, and further including an aft, adjustable portion with flap means at the leading edge on each half of the V-tail delta wing for short takeoffs and steep climb attitudes, said V-tail delta wing being operable to generate two large swirling vortices about its leading edge to create lift forces for the fuselage.

13. A high performance jet airplane comprising:
- a streamlined body defining a body having a delta nose wing and nose strake;
- a winglet carried by the body rearwardly of the delta nose wing;
- a midspan wing carried by the body rearwardly of the winglet, the delta nose wing, the winglet and the midspan wing each having flap means at the rear marginal edge thereof, the midspan wing having a pair of halves, each half being provided with a pair of flaps at its forward end and a flaperon and an extensible flap at its aft end, the flaperon being the outermost control surface and the extensible flap being the innermost control surface of the corresponding half of the midspan wing;
- a pair of high performance jet engines for each side of the body, respectively, a forward jet engine and an aft jet engine on each of the corresponding sides, the forward jet engines substantially spanning the distance between the winglet and the midspan wing, the two aft jet engines being on the underside of the midspan wing;
- an upper body stabilizer for control and stability of the airplane, said stabilizer being secured to the upper portion of the body near the rear end thereof;
- a vertical tail with a forwardly inclined flap and a secondary airfoil;
- a V-tail delta wing with two adjustable sections and flap means on each of the adjustable sections, respectively; and
- an air flow regulator on the underside of the delta nose wing and nose strake, said regulator being operable for directing and controlling the flow field to the underside of the delta nose wing and the nose strake, the airplane having an aft center of gravity which provides full control and high maneuverability at high accelerations and at large angles of attack, the airfoils defined by the delta nose wing, the winglet, the midspan wing and V-tail delta wing defining a single continuum at the bottom of the body of the airplane.

* * * * *